(12) United States Patent
Saqueb et al.

(10) Patent No.: US 12,265,172 B2
(45) Date of Patent: Apr. 1, 2025

(54) VERTICAL MICROSTRIP-TO-WAVEGUIDE TRANSITION

(71) Applicant: Aptiv Technologies AG, Schaffhausen (CH)

(72) Inventors: Syed An Nazmus Saqueb, Westfield, IN (US); Biswadeep Das Gupta, Noblesville, IN (US); Kevin Harnist, Huntley, IL (US)

(73) Assignee: Aptiv Technologies AG, Schaffhausen (CH)

( * ) Notice: Subject to any disclaimer, the term of this patent is extended or adjusted under 35 U.S.C. 154(b) by 413 days.

(21) Appl. No.: 17/804,061

(22) Filed: May 25, 2022

(65) Prior Publication Data

US 2023/0384414 A1    Nov. 30, 2023

(51) Int. Cl.
*G01S 7/03* (2006.01)
*H01P 1/11* (2006.01)
(Continued)

(52) U.S. Cl.
CPC ............... *G01S 7/032* (2013.01); *H01P 1/11* (2013.01); *H01P 3/081* (2013.01); *H01P 5/087* (2013.01); *G01S 13/931* (2013.01)

(58) Field of Classification Search
CPC .......... G01S 7/032; G01S 13/931; H01P 1/11; H01P 3/081; H01P 5/087
See application file for complete search history.

(56) References Cited

U.S. PATENT DOCUMENTS 2,840,818 A    6/1958  Reed et al.
3,462,713 A    8/1969  Knerr
(Continued)

FOREIGN PATENT DOCUMENTS

CA    2654470 A1   12/2007
CN    1620738 A    5/2005
(Continued)

OTHER PUBLICATIONS

"Extended European Search Report", EP Application No. 22159217.3, Aug. 19, 2022, 11 pages.
(Continued)

*Primary Examiner* — Peter M Bythrow
*Assistant Examiner* — Nazra Nur Waheed
(74) *Attorney, Agent, or Firm* — Harness, Dickey & Pierce, P.L.C.

(57) ABSTRACT

This document describes techniques and systems for a vertical microstrip-to-waveguide transition. A radar system may include a monolithic microwave integrated circuit (MIMIC) to generate electromagnetic signals and a printed circuit board (PCB) that includes a first surface, a microstrip, and a grounding pattern. The microstrip can be located on the first surface and operatively connect to the MIMIC. The grounding pattern is located on the first surface and made of conductive material. The radar system also includes a transition channel positioned over the grounding pattern, which includes a vertical taper between a bottom surface and a top surface. The transition channel defines a dielectric-filled portion formed by the grounding pattern and its interior surface. The described vertical transition can reduce manufacturing costs and support a wide bandwidth by tolerating an air gap at the transition-to-waveguide interface.

20 Claims, 7 Drawing Sheets

(51) Int. Cl.
*H01P 3/08* (2006.01)
*H01P 5/08* (2006.01)
*G01S 13/931* (2020.01)

(56) References Cited

U.S. PATENT DOCUMENTS

| | | |
|---|---|---|
| 3,579,149 A | 5/1971 | Ramsey |
| 4,157,516 A | 6/1979 | Grijp |
| 4,453,142 A | 6/1984 | Murphy |
| 4,562,416 A | 12/1985 | Sedivec |
| 5,065,123 A | 11/1991 | Heckaman et al. |
| 5,350,499 A | 9/1994 | Shibaike et al. |
| 5,414,394 A | 5/1995 | Gamand et al. |
| 5,637,521 A | 6/1997 | Rhodes et al. |
| 5,923,225 A | 7/1999 | Santos |
| 5,929,728 A | 7/1999 | Barnett et al. |
| 5,982,250 A | 11/1999 | Hung et al. |
| 5,982,256 A | 11/1999 | Uchimura et al. |
| 5,986,527 A | 11/1999 | Ishikawa et al. |
| 6,064,350 A | 5/2000 | Uchimura et al. |
| 6,072,375 A | 6/2000 | Adkins et al. |
| 6,127,901 A | 10/2000 | Lynch |
| 6,414,573 B1 | 7/2002 | Swineford et al. |
| 6,489,855 B1 | 12/2002 | Kitamori et al. |
| 6,535,083 B1 | 3/2003 | Hageman et al. |
| 6,622,370 B1 | 9/2003 | Sherman et al. |
| 6,658,233 B1 | 12/2003 | Ikeda |
| 6,788,918 B2 | 9/2004 | Saitoh et al. |
| 6,794,950 B2 | 9/2004 | Toit et al. |
| 6,859,114 B2 | 2/2005 | Eleftheriades et al. |
| 6,867,660 B2 | 3/2005 | Kitamori et al. |
| 6,958,662 B1 | 10/2005 | Salmela et al. |
| 6,995,726 B1 | 2/2006 | West et al. |
| 7,142,165 B2 | 11/2006 | Sanchez et al. |
| 7,276,988 B2 | 10/2007 | Stoneham |
| 7,420,442 B1 | 9/2008 | Forman |
| 7,439,822 B2 | 10/2008 | Shimura et al. |
| 7,495,532 B2 | 2/2009 | McKinzie, III |
| 7,626,476 B2 | 12/2009 | Kim et al. |
| 7,659,799 B2 | 2/2010 | Jun et al. |
| 7,886,434 B1 | 2/2011 | Forman |
| 7,973,616 B2 | 7/2011 | Shijo et al. |
| 7,994,879 B2 | 8/2011 | Kim et al. |
| 8,013,694 B2 | 9/2011 | Hiramatsu et al. |
| 8,089,327 B2 | 1/2012 | Margomenos et al. |
| 8,159,316 B2 | 4/2012 | Miyazato et al. |
| 8,395,552 B2 | 3/2013 | Geiler et al. |
| 8,451,175 B2 | 5/2013 | Gummalla et al. |
| 8,451,189 B1 | 5/2013 | Fluhler |
| 8,680,936 B2 | 3/2014 | Purden et al. |
| 8,692,731 B2 | 4/2014 | Lee et al. |
| 8,717,124 B2 | 5/2014 | Vanhille et al. |
| 8,803,638 B2 | 8/2014 | Kildal |
| 8,948,562 B2 | 2/2015 | Norris et al. |
| 9,007,269 B2 | 4/2015 | Lee et al. |
| 9,203,155 B2 | 12/2015 | Choi et al. |
| 9,246,204 B1 | 1/2016 | Kabakian |
| 9,258,884 B2 | 2/2016 | Saito |
| 9,356,238 B2 | 5/2016 | Norris et al. |
| 9,450,281 B2 | 9/2016 | Kim |
| 9,647,313 B2 | 5/2017 | Marconi et al. |
| 9,653,773 B2 | 5/2017 | Ferrari et al. |
| 9,673,532 B2 | 6/2017 | Cheng et al. |
| 9,806,393 B2 | 10/2017 | Kildal et al. |
| 9,813,042 B2 | 11/2017 | Xue et al. |
| 9,843,301 B1 | 12/2017 | Rodgers et al. |
| 9,935,065 B1 | 4/2018 | Baheti et al. |
| 9,947,981 B1 | 4/2018 | Strassner et al. |
| 9,991,606 B2 | 6/2018 | Kirino et al. |
| 9,997,842 B2 | 6/2018 | Kirino et al. |
| 10,027,032 B2 | 7/2018 | Kirino et al. |
| 10,042,045 B2 | 8/2018 | Kirino et al. |
| 10,090,600 B2 | 10/2018 | Kirino et al. |
| 10,114,067 B2 | 10/2018 | Lam et al. |
| 10,153,533 B2 | 12/2018 | Kirino |
| 10,158,158 B2 | 12/2018 | Kirino et al. |
| 10,164,318 B2 | 12/2018 | Seok et al. |
| 10,164,344 B2 | 12/2018 | Kirino et al. |
| 10,218,078 B2 | 2/2019 | Kirino et al. |
| 10,230,173 B2 | 3/2019 | Kirino et al. |
| 10,263,310 B2 | 4/2019 | Kildal et al. |
| 10,312,596 B2 | 6/2019 | Gregoire |
| 10,320,083 B2 | 6/2019 | Kirino et al. |
| 10,333,227 B2 | 6/2019 | Kirino et al. |
| 10,374,323 B2 | 8/2019 | Kamo et al. |
| 10,381,317 B2 | 8/2019 | Maaskant et al. |
| 10,381,741 B2 | 8/2019 | Kirino et al. |
| 10,439,298 B2 | 10/2019 | Kirino et al. |
| 10,468,736 B2 | 11/2019 | Mangaiahgari |
| 10,505,282 B2 | 12/2019 | Lilja |
| 10,534,061 B2 | 1/2020 | Vassilev et al. |
| 10,559,889 B2 | 2/2020 | Kirino et al. |
| 10,594,045 B2 | 3/2020 | Kirino et al. |
| 10,601,144 B2 | 3/2020 | Kamo et al. |
| 10,608,345 B2 | 3/2020 | Kirino et al. |
| 10,622,696 B2 | 4/2020 | Kamo et al. |
| 10,627,502 B2 | 4/2020 | Kirino et al. |
| 10,651,138 B2 | 5/2020 | Kirino et al. |
| 10,651,567 B2 | 5/2020 | Kamo et al. |
| 10,658,760 B2 | 5/2020 | Kamo et al. |
| 10,670,810 B2 | 6/2020 | Sakr et al. |
| 10,705,294 B2 | 7/2020 | Guerber et al. |
| 10,707,584 B2 | 7/2020 | Kirino et al. |
| 10,714,802 B2 | 7/2020 | Kirino et al. |
| 10,727,561 B2 | 7/2020 | Kirino et al. |
| 10,727,611 B2 | 7/2020 | Kirino et al. |
| 10,763,590 B2 | 9/2020 | Kirino et al. |
| 10,763,591 B2 | 9/2020 | Kirino et al. |
| 10,775,573 B1 | 9/2020 | Hsu et al. |
| 10,811,373 B2 | 10/2020 | Zaman et al. |
| 10,826,147 B2 | 11/2020 | Sikina et al. |
| 10,833,382 B2 | 11/2020 | Sysouphat |
| 10,833,385 B2 | 11/2020 | Mangaiahgari |
| 10,892,536 B2 | 1/2021 | Fan et al. |
| 10,957,971 B2 | 3/2021 | Doyle et al. |
| 10,957,988 B2 | 3/2021 | Kirino et al. |
| 10,971,824 B2 | 4/2021 | Baumgartner et al. |
| 10,983,194 B1 | 4/2021 | Patel et al. |
| 10,985,434 B2 | 4/2021 | Wagner et al. |
| 10,992,056 B2 | 4/2021 | Kamo et al. |
| 11,061,110 B2 | 7/2021 | Kamo et al. |
| 11,088,432 B2 | 8/2021 | Seok et al. |
| 11,088,464 B2 | 8/2021 | Sato et al. |
| 11,114,733 B2 | 9/2021 | Doyle et al. |
| 11,121,475 B2 | 9/2021 | Yang et al. |
| 11,169,325 B2 | 11/2021 | Guerber et al. |
| 11,171,399 B2 | 11/2021 | Alexanian et al. |
| 11,196,171 B2 | 12/2021 | Doyle et al. |
| 11,201,414 B2 | 12/2021 | Doyle et al. |
| 11,249,011 B2 | 2/2022 | Challener |
| 11,283,162 B2 * | 3/2022 | Doyle .................. H01Q 1/3233 |
| 11,289,787 B2 | 3/2022 | Yang |
| 11,303,004 B2 * | 4/2022 | Yung .................. H01Q 19/132 |
| 11,349,183 B2 | 5/2022 | Rahiminejad et al. |
| 11,349,220 B2 | 5/2022 | Alexanian et al. |
| 11,378,683 B2 | 7/2022 | Alexanian et al. |
| 11,411,292 B2 | 8/2022 | Kirino |
| 11,495,871 B2 | 11/2022 | Vosoogh et al. |
| 11,563,259 B2 | 1/2023 | Alexanian et al. |
| 11,611,138 B2 | 3/2023 | Ogawa et al. |
| 11,616,306 B2 | 3/2023 | Brandenburg et al. |
| 11,626,652 B2 | 4/2023 | Vilenskiy et al. |
| 2002/0021197 A1 * | 2/2002 | Elco ..................... H01P 3/165 |
| | | 333/248 |
| 2004/0069984 A1 | 4/2004 | Estes et al. |
| 2006/0113598 A1 | 6/2006 | Chen et al. |
| 2006/0145777 A1 | 7/2006 | Mueller |
| 2008/0129409 A1 | 6/2008 | Nagaishi et al. |
| 2008/0150821 A1 | 6/2008 | Koch et al. |
| 2009/0040132 A1 | 2/2009 | Sridhar et al. |
| 2009/0207090 A1 | 8/2009 | Pettus et al. |
| 2009/0243762 A1 | 10/2009 | Chen et al. |
| 2010/0193935 A1 | 8/2010 | Lachner et al. |

(56) References Cited

U.S. PATENT DOCUMENTS

| | | | |
|---|---|---|---|
| 2011/0001579 A1* | 1/2011 | Boffa | H01P 9/00 333/159 |
| 2011/0140810 A1 | 6/2011 | Leiba et al. | |
| 2011/0140979 A1 | 6/2011 | Dayan et al. | |
| 2012/0013421 A1 | 1/2012 | Hayata | |
| 2012/0050125 A1 | 3/2012 | Leiba et al. | |
| 2012/0068316 A1 | 3/2012 | Ligander | |
| 2012/0163811 A1 | 6/2012 | Doany et al. | |
| 2012/0242421 A1 | 9/2012 | Robin et al. | |
| 2012/0256707 A1 | 10/2012 | Leiba et al. | |
| 2012/0256796 A1 | 10/2012 | Leiba | |
| 2013/0057358 A1 | 3/2013 | Anthony et al. | |
| 2013/0256849 A1 | 10/2013 | Danny et al. | |
| 2014/0015709 A1 | 1/2014 | Shijo et al. | |
| 2014/0048310 A1 | 2/2014 | Montevirgen et al. | |
| 2014/0091884 A1 | 4/2014 | Flatters | |
| 2014/0106684 A1 | 4/2014 | Burns et al. | |
| 2014/0287703 A1* | 9/2014 | Herbsommer | H01Q 13/02 333/21 R |
| 2015/0097633 A1 | 4/2015 | Devries et al. | |
| 2015/0229017 A1 | 8/2015 | Suzuki et al. | |
| 2015/0295297 A1 | 10/2015 | Cook et al. | |
| 2015/0357698 A1* | 12/2015 | Kushta | H01P 3/088 333/238 |
| 2015/0364804 A1 | 12/2015 | Tong et al. | |
| 2015/0364830 A1 | 12/2015 | Tong et al. | |
| 2016/0043455 A1 | 2/2016 | Seler et al. | |
| 2016/0049714 A1 | 2/2016 | Ligander et al. | |
| 2016/0056541 A1 | 2/2016 | Tageman et al. | |
| 2016/0111764 A1 | 4/2016 | Kim | |
| 2016/0118705 A1 | 4/2016 | Tang et al. | |
| 2016/0204495 A1 | 7/2016 | Takeda et al. | |
| 2016/0276727 A1 | 9/2016 | Dang et al. | |
| 2016/0293557 A1 | 10/2016 | Topak et al. | |
| 2016/0301125 A1 | 10/2016 | Kim et al. | |
| 2017/0084554 A1 | 3/2017 | Dogiamis et al. | |
| 2017/0099705 A1 | 4/2017 | Mazzon | |
| 2017/0324135 A1 | 11/2017 | Blech et al. | |
| 2018/0131084 A1 | 5/2018 | Park et al. | |
| 2018/0226709 A1 | 8/2018 | Mangaiahgari | |
| 2018/0226727 A1 | 8/2018 | Sato | |
| 2018/0233465 A1 | 8/2018 | Spella et al. | |
| 2018/0284186 A1 | 10/2018 | Chadha et al. | |
| 2018/0301816 A1 | 10/2018 | Kamo et al. | |
| 2018/0343711 A1 | 11/2018 | Wixforth et al. | |
| 2018/0351261 A1 | 12/2018 | Kamo et al. | |
| 2018/0375185 A1 | 12/2018 | Kirino et al. | |
| 2019/0006743 A1 | 1/2019 | Kirino et al. | |
| 2019/0013563 A1 | 1/2019 | Takeda et al. | |
| 2019/0194452 A1 | 6/2019 | Schrauwen | |
| 2019/0207286 A1 | 7/2019 | Moallem | |
| 2020/0021001 A1 | 1/2020 | Mangaiahgari | |
| 2020/0153108 A1 | 5/2020 | Uemichi | |
| 2020/0220273 A1 | 7/2020 | Ahmadloo | |
| 2020/0235453 A1 | 7/2020 | Ang | |
| 2020/0241107 A1 | 7/2020 | Gentili et al. | |
| 2020/0287293 A1 | 9/2020 | Shi et al. | |
| 2020/0343612 A1 | 10/2020 | Shi | |
| 2020/0388899 A1 | 12/2020 | Yung et al. | |
| 2020/0412012 A1* | 12/2020 | Zhao | H01Q 21/005 |
| 2021/0028549 A1 | 1/2021 | Doyle et al. | |
| 2021/0036393 A1 | 2/2021 | Mangaiahgari | |
| 2021/0159577 A1 | 5/2021 | Carlred et al. | |
| 2021/0305667 A1 | 9/2021 | Bencivenni | |
| 2021/0367352 A1 | 11/2021 | Izadian et al. | |
| 2022/0094071 A1 | 3/2022 | Doyle et al. | |
| 2022/0109246 A1 | 4/2022 | Emanuelsson et al. | |
| 2022/0140488 A1* | 5/2022 | Hollaender | H05K 1/0243 343/772 |

FOREIGN PATENT DOCUMENTS

| | | |
|---|---|---|
| CN | 1682404 A | 10/2005 |
| CN | 2796131 | 7/2006 |
| CN | 201383535 | 1/2010 |
| CN | 102696145 A | 9/2012 |
| CN | 103515682 A | 1/2014 |
| CN | 104900956 A | 9/2015 |
| CN | 105098295 A | 11/2015 |
| CN | 105609909 A | 5/2016 |
| CN | 105680133 A | 6/2016 |
| CN | 105958167 A | 9/2016 |
| CN | 106711616 A | 5/2017 |
| CN | 106785424 A | 5/2017 |
| CN | 109716861 A | 5/2019 |
| CN | 109750201 A | 5/2019 |
| CN | 209389219 U | 9/2019 |
| DE | 4241635 A1 | 6/1994 |
| DE | 102016213202 A1 | 1/2018 |
| DE | 102019200893 A1 | 7/2020 |
| EP | 2500978 A1 | 9/2012 |
| EP | 2843758 A1 | 3/2015 |
| EP | 2945222 A1 | 11/2015 |
| EP | 3460903 A1 | 3/2019 |
| GB | 2489950 A | 10/2012 |
| JP | 2000357916 A | 12/2000 |
| JP | 2003243902 A | 8/2003 |
| JP | 2003289201 A | 10/2003 |
| JP | 3923360 B2 | 5/2007 |
| KR | 20030031585 A | 4/2003 |
| KR | 20080044752 A | 5/2008 |
| KR | 1020080044752 A | 5/2008 |
| WO | 2013189513 A1 | 12/2013 |
| WO | 2018003932 A1 | 1/2018 |
| WO | 2018095541 A1 | 5/2018 |
| WO | 2019085368 A1 | 5/2019 |
| WO | 2021122725 A1 | 6/2021 |

OTHER PUBLICATIONS

"Extended European Search Report", EP Application No. 22170487.7, Sep. 8, 2022, 11 pages.

"Foreign Office Action", CN Application No. 202111321802.9, Jul. 29, 2023, 17 pages.

"Foreign Office Action", CN Application No. 202210282861.8, Jun. 1, 2023, 13 pages.

"Foreign Office Action", EP Application No. 21203201.5, Jun. 15, 2023, 11 pages.

Ghahramani, et al., "Reducing Mutual Coupling of SIW Slot Array Antenna Using Uniplanar Compact EBG (UC-EBG) Structure", The 8th European Conference on Antennas and Propagation (EuCAP 2014), Apr. 6, 2014, pp. 2002-2004.

Rajo-Iglesias, et al., "Gap Waveguide Technology for Millimeter-Wave Antenna Systems", IEEE Communications Magazine, vol. 56, No. 7, Jul. 2018, pp. 14-20.

"Extended European Search Report", EP Application No. 23167063.9, Sep. 11, 2023, 12 pages.

"Extended European Search Report", EP Application No. 23167836.8, Sep. 11, 2023, 10 pages.

Ferrando-Rocher Miguel et al: "A Half-Mode Groove Gap Waveguide for Single-Layer Antennas in the Millimeter-Wave Band", IEEE Antennas and Wireless Propagation Letters, IEEE, Piscataway, NJ, US, vol. 21, No. 12, Jul. 27, 2022, pp. 2402-2406, XP011928651, ISSN: 1536-1225, DOI: 10.1109/LAWP.2022.3194665.

"Extended European Search Report", EP Application No. 22188348.1, Mar. 14, 2023, 8 pages.

"Foreign Office Action", CN Application No. 201810122408.4, Jan. 30, 2023, 21 pages.

"Foreign Office Action", CN Application No. 202111321802.9, Mar. 31, 2023, 16 pages.

Henawy, et al., "Integrated Antennas in eWLB Packages for 77 GHZ and 79 GHZ Automotive Radar Sensors", 2011 41st European Microwave Conference, Oct. 10, 2011, pp. 1312-1315.

Schellenberg, et al., "CAD Models for Suspended and Inverted Microstrip", IEEE Transactions on Microwave Theory and Techniques, vol. 43, No. 6, Jun. 1995, pp. 1247-1252.

Extended European Search Report regarding European Patent Application No. 23163662.2, dated Oct. 17, 2023.

(56) References Cited

OTHER PUBLICATIONS

"Extended European Search Report", EP Application No. 18153137.7, Jun. 15, 2018, 8 pages.
"Extended European Search Report", EP Application No. 20166797, Sep. 16, 2020, 11 pages.
"Extended European Search Report", EP Application No. 21203201.5, Apr. 7, 2022, 12 pages.
"Foreign Office Action", CN Application No. 201810122408.4, Jun. 2, 2021, 15 pages.
"Foreign Office Action", CN Application No. 201810122408.4, Oct. 18, 2021, 19 pages.
Jankovic, et al., "Stepped Bend Substrate Integrated Waveguide to Rectangular Waveguide Transitions", Jun. 2016, 2 pages.
Tong, et al., "A Vertical Transition Between Rectangular Waveguide and Coupled Microstrip Lines", IEEE Microwave and Wireless Components Letters, vol. 22, No. 5, May 2012, pp. 251-253.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Wang, et al., "Mechanical and Dielectric Strength of Laminated Epoxy Dielectric Graded Materials", Mar. 2020, 15 pages.
"Foreign Office Action", CN Application No. 201810122408.4, Jan. 26, 2022, 15 pages.
"Foreign Office Action", CN Application No. 201810122408.4, May 6, 2022, 15 pages.
"Foreign Office Action", CN Application No. 201810122408.4, Sep. 20, 2022, 19 pages.
"Foreign Office Action", CN Application No. 202111321802.9, Nov. 22, 2022, 17 pages.
Bauer, et al., "A wideband transition from substrate integrated waveguide to differential microstrip lines in multilayer substrates", Sep. 2010, pp. 811-813.
Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.
Deslandes, et al., "Integrated Transition of Coplanar to Rectangular Waveguides", 2001 IEEE MTT-S International Microwave Sympsoium Digest, pp. 619-622.
Deutschmann, et al., "A Full W-Band Waveguide-to-Differential Microstrip Transition", Jun. 2019, pp. 335-338.
Giese, et al., "Compact Wideband Single-ended and Differential Microstrip-to-waveguide Transitions at W-band", Jul. 2015, 4 pages.
Tong, et al., "A Wide Band Transition from Waveguide to Differential Microstrip Lines", Dec. 2008, 5 pages.
Yuasa, et al., "A millimeter wave wideband differential line to waveguide transition using short ended slot line", Oct. 2014, pp. 1004-1007.

* cited by examiner ns VERTICAL MICROSTRIP-TO-WAVEGUIDE TRANSITION

BACKGROUND

Some devices (e.g., radar systems) use electromagnetic signals to detect and track objects. The electromagnetic signals are transmitted and received using one or more antennas. The electromagnetic signals are often generated by monolithic microwave integrated circuits (MMICs) or other processors located on the same chip or printed circuit board (PCB) as the antennas. The transition between the MMIC and the waveguide or antenna can impact the performance, size, and cost of radar systems. The design and arrangement of the transition can ensure optimal radar performance while preserving a small module profile and minimizing manufacturing costs.

SUMMARY

This document describes techniques, apparatuses, and systems for a vertical microstrip-to-waveguide transition. An apparatus (e.g., a radar system) may include an MIMIC or other processor to generate electromagnetic signals. The apparatus can include a PCB that includes a first surface, a microstrip, and a grounding pattern. The microstrip can be located on the first surface and operatively connected to the MIMIC or other processor. The grounding pattern is also located on the first surface and is made of conductive material. The apparatus can also include a transition channel mounted on the first surface and positioned over the grounding pattern. The transition channel includes a bottom surface, a top surface, and an aperture in the top surface. The transition channel includes a vertical taper between the bottom surface and the top surface and defines a dielectric-filled portion formed by the grounding pattern and an interior surface of the transition channel. The described vertical microstrip-to-waveguide transition can reduce manufacturing costs and support a wide bandwidth by tolerating an air gap at the transition-to-waveguide interface.

This document also describes methods performed by the above-summarized techniques, apparatuses, and systems, and other methods set forth herein, as well as means for performing these methods.

This Summary introduces simplified concepts related to a vertical microstrip-to-waveguide transition, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a vertical microstrip-to-waveguide transition are described in this document with reference to the following figures. The same numbers are often used throughout the drawings to reference like features and components:

FIGS. 2-1 through 2-3 illustrate views of a vertical microstrip-to-waveguide transition;

FIGS. 3-1 and 3-2 illustrate perspective views of another example vertical microstrip-to-waveguide transition.

DETAILED DESCRIPTION

Overview

Figure 1:
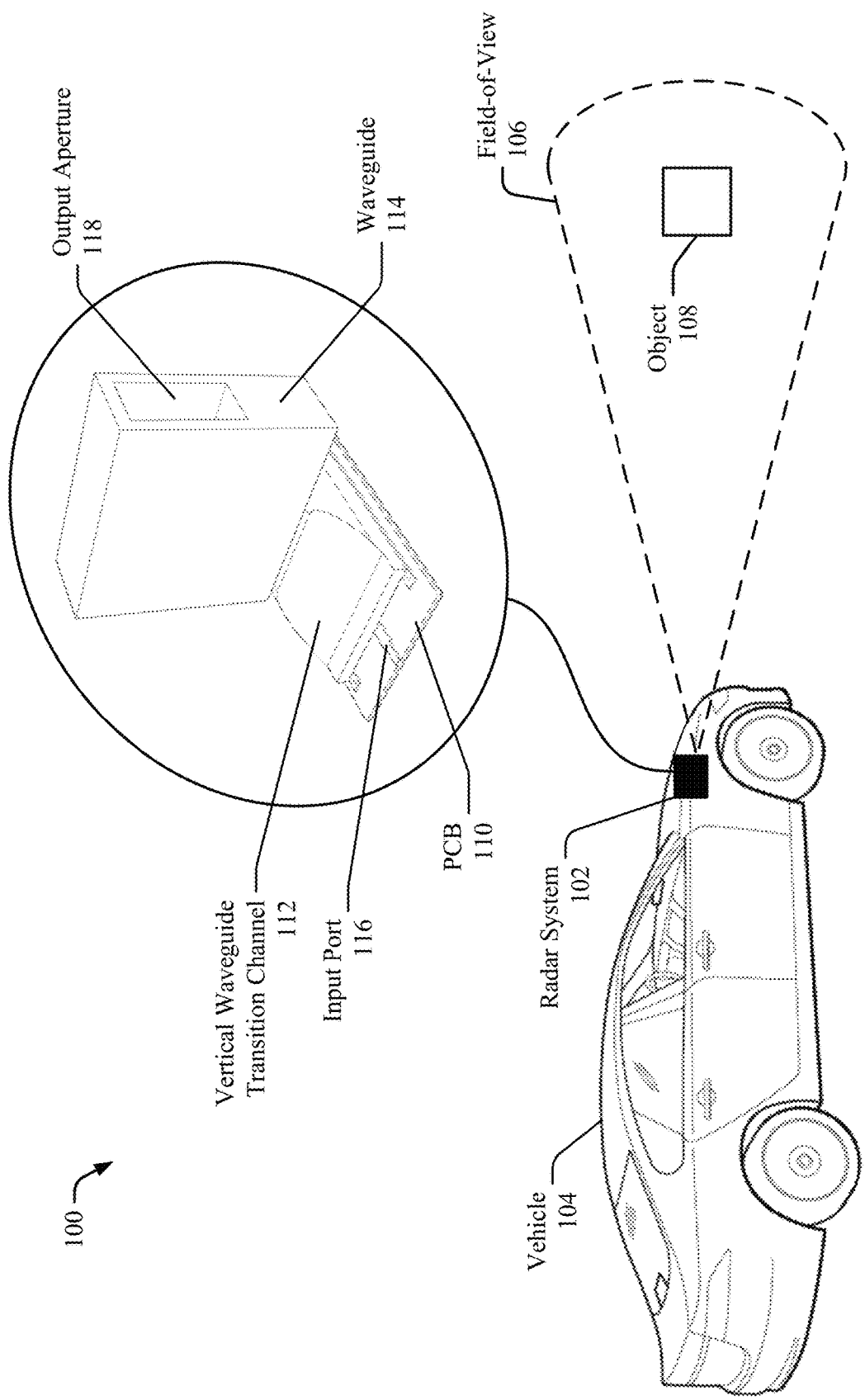
FIG. 1 illustrates an example environment in which a radar system with a vertical microstrip-to-waveguide transition is used on a vehicle.

In the development of radar systems (e.g., for automotive applications), it is important to find a balance between performance, size, and cost. With recent MIMIC technology, passive and active microwave elements are integrated into a single chip that is a few square millimeters in size. The antenna (e.g., antenna arrays), however, which largely impact the range and resolution of the radar system, are generally much larger. Therefore, a careful design and arrangement of the transition between the MIMIC and the antenna are crucial to ensure optimal radar performance while preserving a small profile and minimizing manufacturing costs.

There are several major concerns for evaluating a transition design: reflection loss, operational bandwidth, manufacturing robustness, and cost. Reflection loss is due to impedance mismatch. Wider bandwidth is preferred to accommodate frequency shifts caused by manufacturing errors and tolerances. For mass production of radar systems, the transition design must be economical and robust enough against normal manufacturing tolerances. Lastly, miniaturization of transition designs and overall radar packaging has become increasingly important to allow for easier layouts, shorter routing, and compact module profiles.

To achieve a compact design, PCBs can utilize through-board transitions to transfer electrical signals (e.g., electromagnetic (EM) energy) from feeding lines from an MMIC on one side of the PCB to inputs of an antenna or a radio frequency (RF) structure on another side. A through-board transition allows a separate antenna board to be placed back-to-back with the MMIC board, reducing the overall size of the PCB compared to a planar approach (discussed below). This design transforms an on-board planar feeding line to a through-board equivalent dielectric-filled waveguide which consists of a series of rectangular metal openings etched on each dielectric layer and through-board via fences surrounding the metal openings. There are, however, several challenges associated with through-board transitions and the accuracy of their fabrication, including etching, imaging, and layer alignment. In addition, these transitions can have relatively high transmission loss. As a result, through-board transitions may reduce the power delivered to the antenna or RF structure, limiting operations of the radar system (e.g., limiting radar detections of a nearby object). In addition, through-board transitions often cannot be fabricated with low-cost PCB materials and instead may require high-cost materials and expensive fabrication techniques.

The performance of through-board transitions is also sensitive to manufacturing tolerances. The multi-layer design of through-board transitions often includes several critical geometries that are susceptible to manufacturing errors, such as those caused by over/under-etching, layer misalignment, and board thickness variations. These manufacturing variables can result in significant decreases in energy passing through the through-board transition due to shifted operational bandwidth.

To mitigate these challenges, some radar systems do not include through-board transitions. Instead, the PCB components may be located on the same board and same side as the antenna or RF structure. Planar transitions can be fabricated on the same PCB where both the MIMIC and antenna are located. Depending on the type of feeding structures of the MMIC and antenna, the design variants include a microstrip-to-differential, microstrip-to-substrate integrated waveguide (SIW), and a differential-to-SIW design. For example, an integrated circuit (IC) may be located next to the antenna, eliminating a need for through-board transitions. There are, however, several drawbacks to planar transitions. For example, the IC needs to be shielded to reduce interaction with the antenna. The antenna may need to be reduced in size, which may further reduce antenna performance characteristics. The PCB may also need to be larger to allow for mounting of the PCB components on the same side. There can be additional costs associated with this type of PCB if a dual-sided surface-mount technology (SMT) process is required.

To address these challenges, this document describes a vertical microstrip-to-waveguide transition that utilizes a vertical waveguide transition channel. The vertical transition described herein utilizes a grounding pattern mounted on the PCB and a transition channel with a vertical taper. The shape and size of the components of the described vertical microstrip-to-waveguide transition are designed to increase the bandwidth, lower manufacturing costs, and improve performance. The high bandwidth is realized by providing a transition design that tolerates a small air gap at the interface between the transition channel and a waveguide (or testing port). The slimmer topology also makes the layout arrangement more flexible and smaller. In addition, the transition channel can act as a heatsink for the MMIC and/or PCB, reducing costs for separate heatsink components.

The vertical microstrip-to-waveguide transition described herein can also reduce manufacturing costs associated with the transition channel fabrication. Some vertical transitions require no or very small air gaps at the PCB-transition interface or transition-waveguide interface to maintain a high bandwidth. In contrast, the described techniques, apparatuses, and systems for a vertical microstrip-to-waveguide transition reduce the need for precise alignment of the transitions from the PCB to the transition channel and from the transition channel to the waveguide. As a result, low-cost materials and manufacturing processes may be utilized without sacrificing bandwidth.

This example vertical waveguide transition channel is just one example of the described techniques, apparatuses, and systems of a vertical microstrip-to-waveguide transition. This document describes other examples and implementations.

Operating Environment

FIG. 1 illustrates an example environment 100 in which a radar system 102 with a vertical waveguide transition channel 112 is used on a vehicle 104. The vehicle 104 may use the vertical waveguide transition channel 112 to enable operations of the radar system 102 that is configured to determine a proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the vertical waveguide transition channel 112 and support techniques described herein.

In the depicted environment 100, the radar system 102 is mounted near or integrated within a front portion of vehicle 104 to detect object 108 and avoid collisions. The radar system 102 provides a field-of-view 106 towards one or more objects 108. The radar system 102 can project the field-of-view 106 from any exterior surface of the vehicle 104. For example, vehicle manufacturers can integrate the radar system 102 into a bumper, side mirror, headlights, rear lights, or any other interior or exterior location where the object 108 requires detection. In some cases, the vehicle 104 includes multiple radar systems 102, such as a first radar system 102 and a second radar system 102 that provide a larger field-of-view 106.

In general, vehicle manufacturers can design the locations of one or more radar systems 102 to provide a particular field-of-view 106 that encompasses a region of interest, including, for instance, in or around a travel lane aligned with a vehicle path. Example fields-of-view 106 include a 360-degree field-of-view, one or more 180-degree fields-of-view, one or more 90-degree fields-of-view, and so forth, which can overlap or be combined into a field-of-view 106 of a particular size.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a road portion.

The radar system 102 emits electromagnetic radiation by transmitting one or more electromagnetic signals or waveforms via an antenna (not illustrated). In the environment 100, the radar system 102 can detect and track the object 108 by transmitting and receiving one or more radar signals. For example, the radar system 102 can transmit electromagnetic signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108 and from the object 108 back to the radar system 102. The radar system 102 can also determine the location of object 108 in terms of an angle based on the direction of a maximum amplitude echo signal received by the radar system 102.

The radar system 102 can be part of the vehicle 104. Vehicle 104 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about the distance to and the location of the object

108 to enable the autonomous-driving system to perform emergency braking, perform a lane change, or adjust the speed of the vehicle 104.

The radar system 102 generally includes an MMIC (not illustrated), a transmitter (not illustrated), and at least one antenna, including the vertical waveguide transition channel 112 and a waveguide 114, to transmit electromagnetic signals. The radar system 102 generally includes the MIMIC, a receiver (not illustrated), and at least one antenna, including the vertical waveguide transition channel 112 and the waveguide 114, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna and determine the location of object 108 relative to the radar system 102. The processor can also generate radar data for automotive systems. For example, the processor can control, based on processed electromagnetic energy from the antenna, an autonomous or semi-autonomous driving system of the vehicle 104.

The radar system 102 includes a PCB 110, the vertical waveguide transition channel 112, and the waveguide 114. An input port 116 introduces EM energy that is radiated through the vertical waveguide transition channel 112 to the waveguide 114 and out through an output aperture 118 of the waveguide 114. As described in greater detail with respect to FIGS. 2-1 through 3-2, the vertical waveguide transition channel 112 forms a dielectric-filled cavity that is formed using its interior surfaces, a grounding pattern on the top surface of the PCB 110, and via fences.

The electrical current flowing along the input port 116 induces magnetic or electromagnetic fields that act as a magnetic or electromagnetic source to excite EM waves inside the vertical waveguide transition channel 112. The vertical waveguide transition channel 112 guides the EM energy upward to an aperture on the top surface and to an input aperture of the waveguide 114, where the EM energy can be delivered to an antenna input, via the output aperture 118, on a separate PCB. The vertical waveguide transition channel 112 can be any solid material, including wood, carbon fiber, fiberglass, metal, plastic, or a combination thereof.

Figures 1, 2:
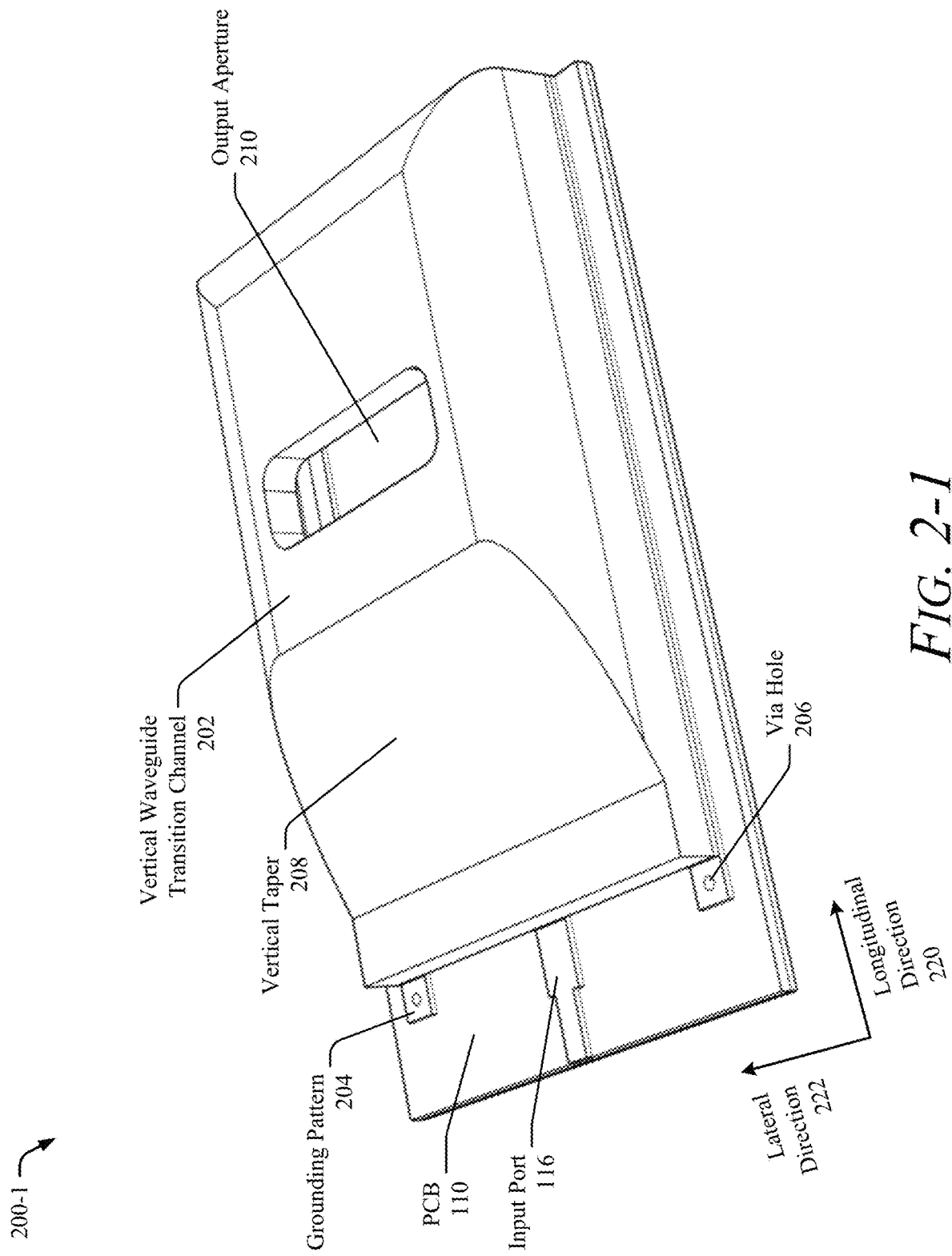
Figure 2:
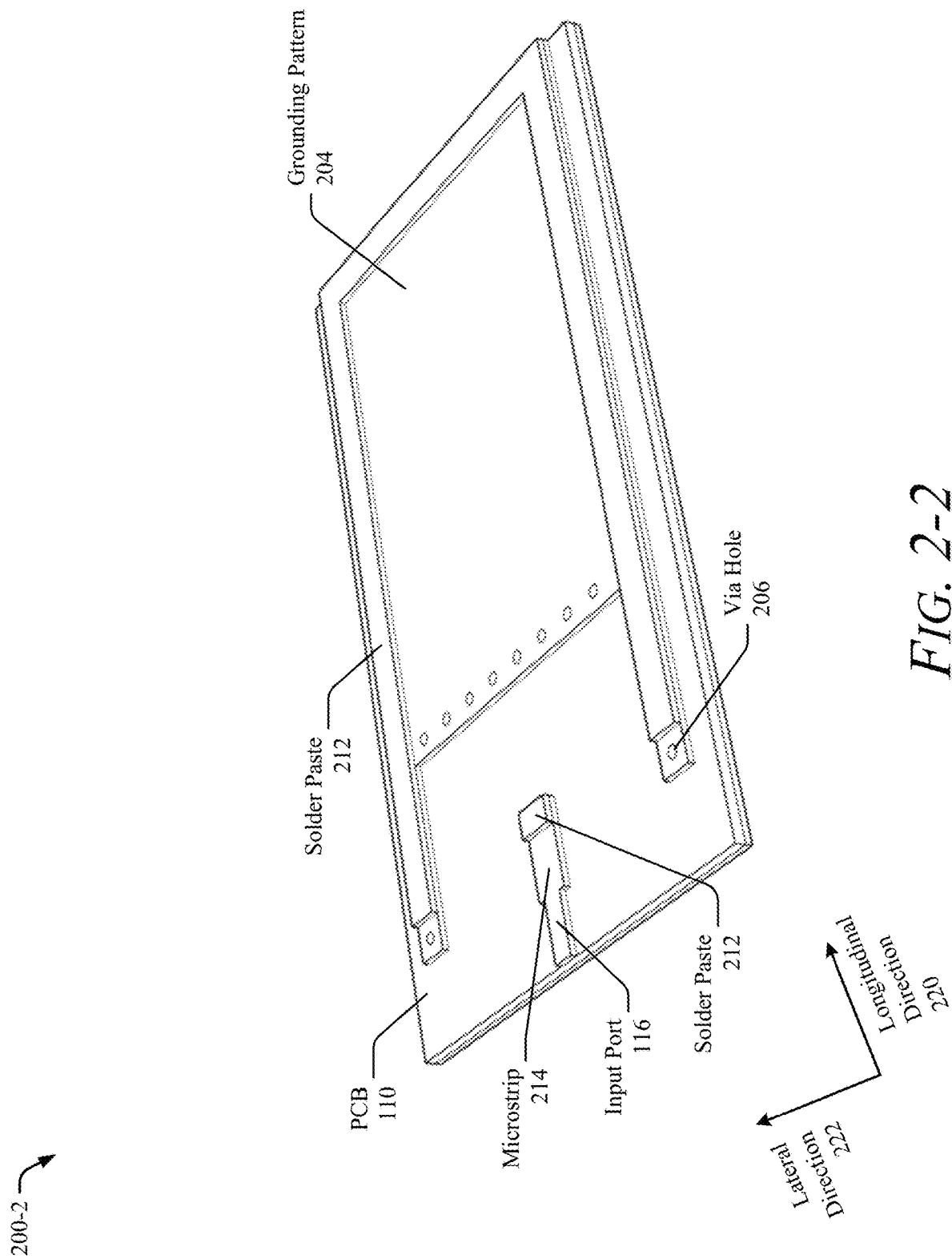
Figures 2, 3:
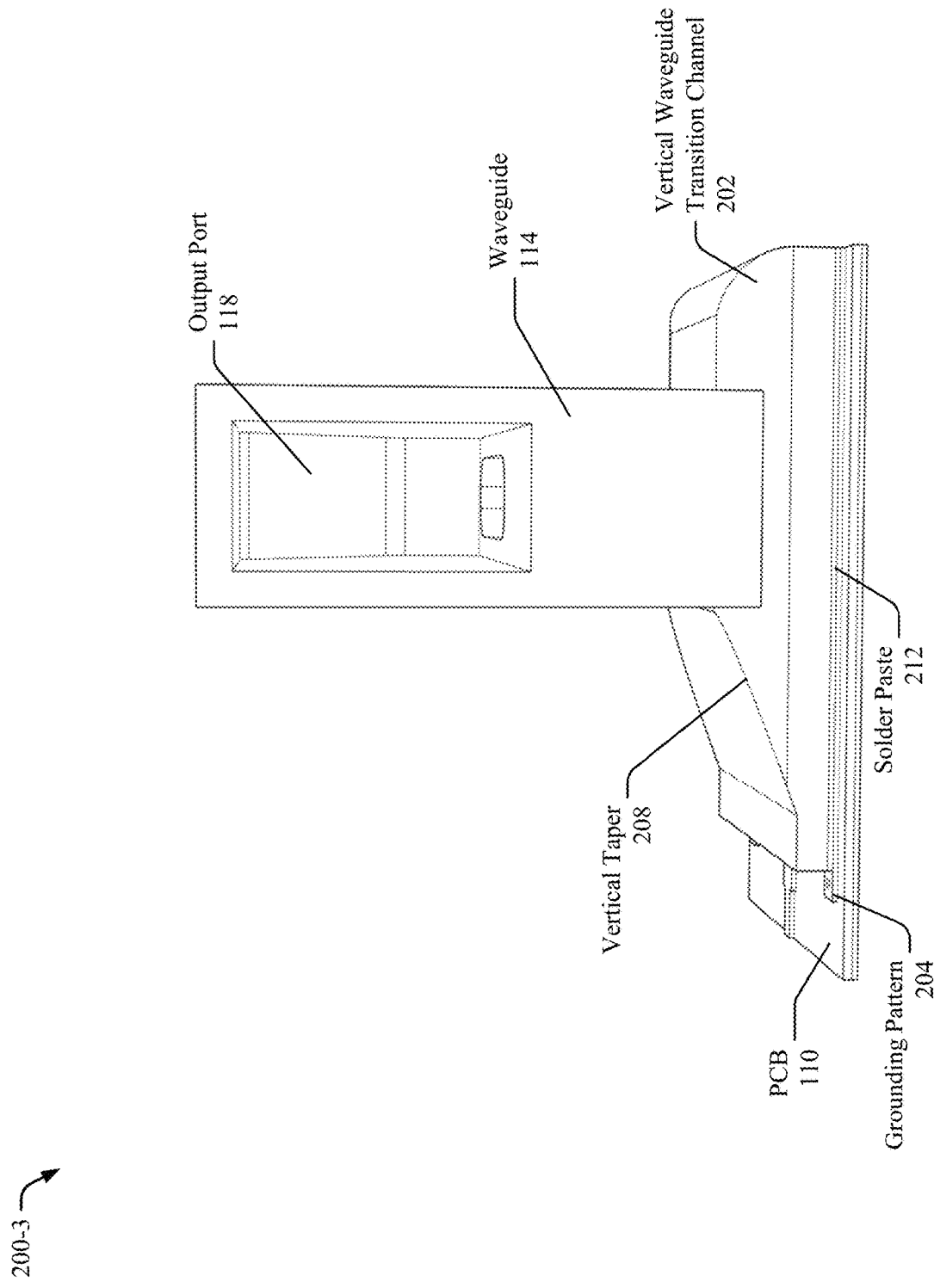
Figures 1, 3:
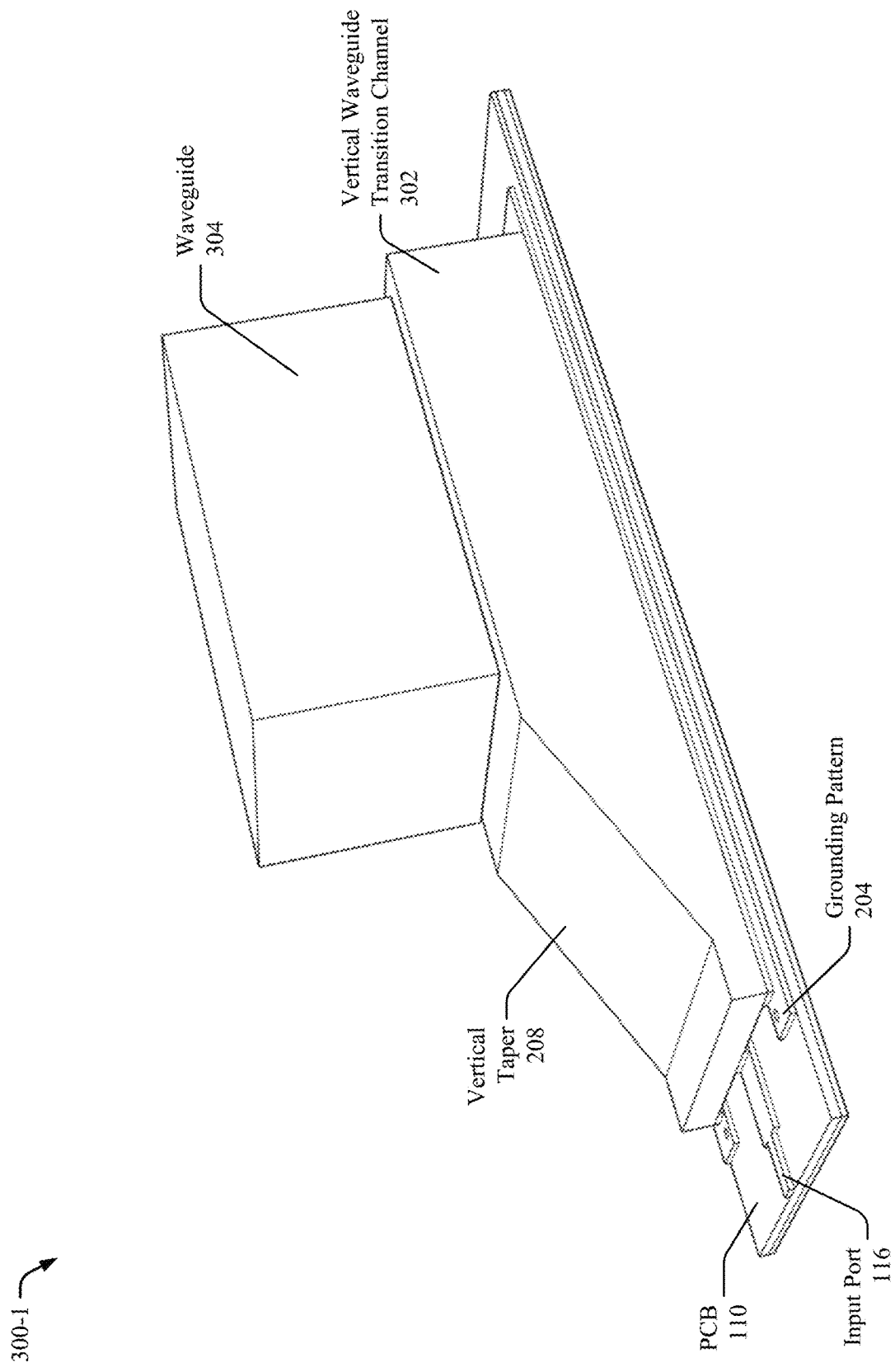
Figures 2, 3:
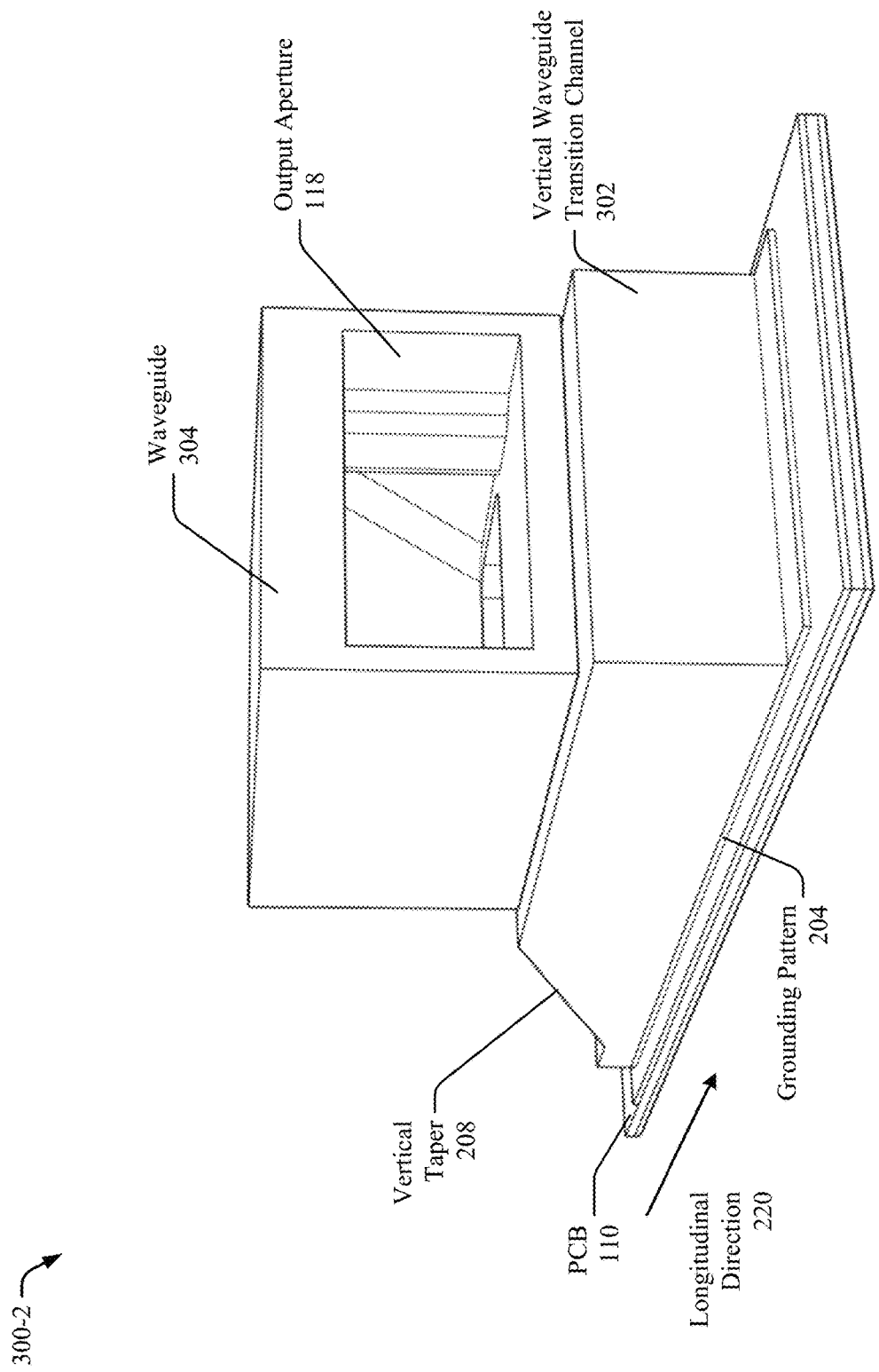
Figure 4:
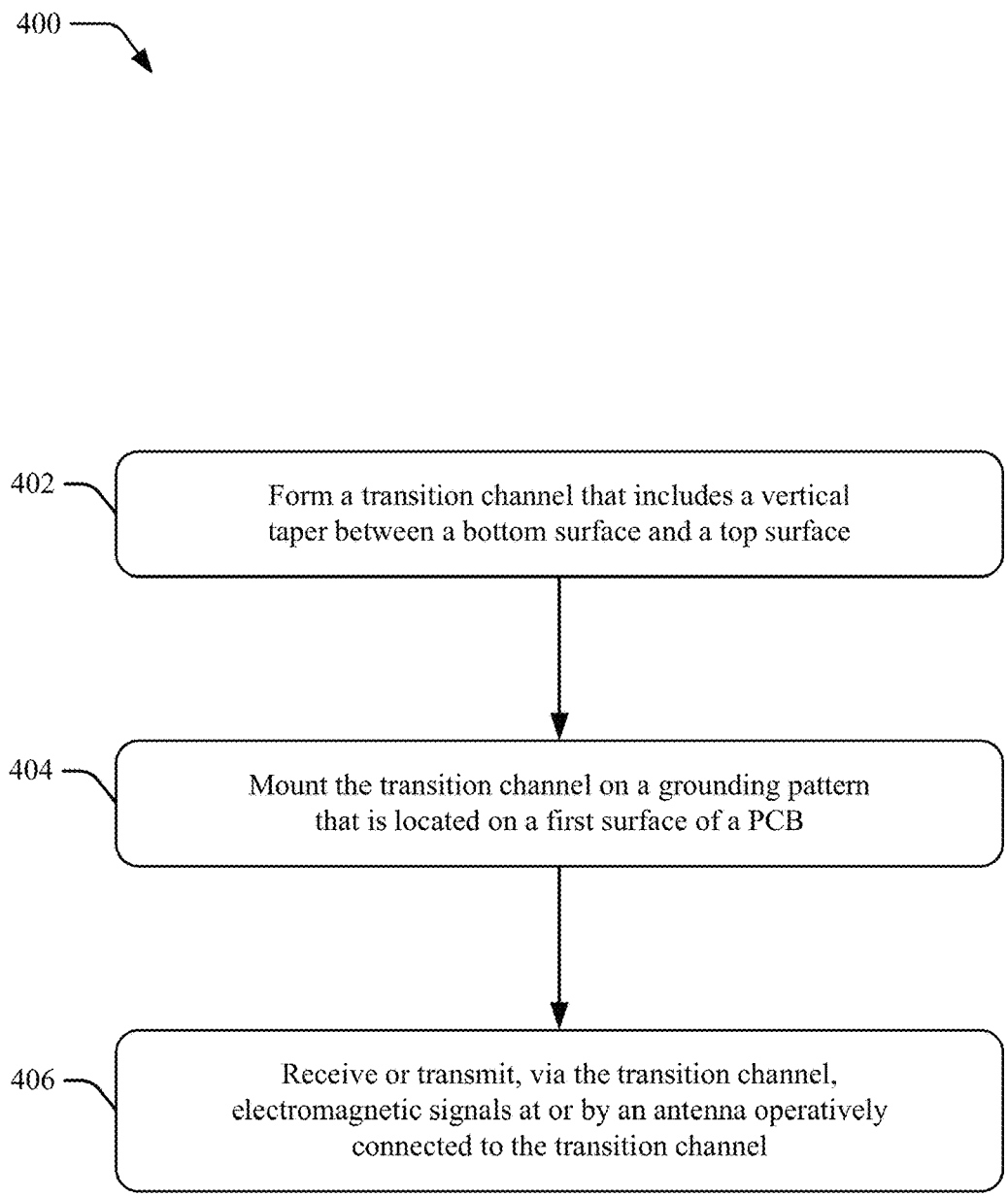
FIG. 4 illustrates an example method for manufacturing a vertical microstrip-to-waveguide transition following techniques, apparatuses, and systems of this disclosure.

This document describes example embodiments of the vertical waveguide transition channel 112 to reduce energy loss and support a wide bandwidth in greater detail with respect to FIGS. 2 through 4. The design of the described vertical waveguide transition channel 112 is also highly customizable to accommodate tight space constraints on the PCB 110 or different waveguide designs. In this way, the described vertical waveguide transition channel 112 enables a compact circuitry layout for the radar system 102 to reduce manufacturing costs and transmission losses.

FIGS. 2-1 through 2-3 illustrate views of a vertical waveguide transition channel 202. The vertical waveguide transition channel 202 is an example of the vertical waveguide transition channel 112 of FIG. 1. FIGS. 2-1 and 2-2 include a reference coordinate system with a longitudinal direction 220 and a lateral direction 222 to indicate the relative positioning of aspects of the upward microstrip-to-waveguide transition.

FIG. 2-1 illustrates a top perspective view 200-1 of the vertical waveguide transition channel 202. FIG. 2-2 illustrates another top perspective view 200-2 of the vertical microstrip-to-waveguide transition without the vertical waveguide transition channel 202 to illustrate the components underneath. FIG. 2-3 illustrates a side view of the vertical waveguide transition channel 202 with the waveguide 114. The vertical microstrip-to-waveguide transition, which is illustrated in FIGS. 2-1 through 2-3, includes the PCB 110, the input port 116, the vertical waveguide transition channel 202, a grounding pattern 204, and the waveguide 114. In other implementations, the vertical waveguide transition channel 202 can transition to a test port or other component.

The PCB 110 can include three or more dielectric layers, e.g., a first dielectric layer, a second dielectric layer, and a third dielectric layer. The input port 116 and the grounding pattern 204 are part of the PCB 110. In particular, the input port 116 and the grounding pattern 204 can be formed on or as part of the first dielectric layer and be metal or a metal-plated microstrip. The input port 116 includes a microstrip 214 that provides impedance matching to the feed lines from a MIMIC or other processor. The input port 116 is placed near the short wall of the vertical waveguide transition channel 202 to efficiently excite the traveling electromagnetic wave inside a dielectric-filled cavity or portion of the vertical waveguide transition channel 202.

The grounding pattern 204 encloses the bottom of the dielectric-filled cavity within the vertical waveguide transition channel 202. The grounding pattern 204 can be metal or a metal-plated material. The grounding pattern 204 has an approximately rectangular cross-section with two arms extending in the longitudinal direction 220 toward the input port 116 on the lateral sides of the grounding pattern 204. The rectangular cross-section of the grounding pattern 204 approximately matches the dimensions of the dielectric-filled cavity formed by the interior of the vertical waveguide transition channel 202. In particular, a width of the grounding pattern 204 (e.g., in the lateral direction 222) matches or approximately matches the width of the vertical waveguide transition channel 202. A length (e.g., in the longitudinal direction 220) of the grounding pattern 204 that includes both the rectangular cross-section and the arms is a small distance longer than the length of the vertical waveguide transition channel 202. The extra length portion of the arms of the grounding pattern 204 provides space for one of the via holes 206 that is not covered by the vertical waveguide transition channel 202.

The grounding pattern 204 includes multiple via holes 206 to the second or third dielectric layer of the PCB 110 along its arms and the longitudinal edge of the rectangular cross-section nearest the input port 116. The via holes 206 form a via fence that together with the vertical waveguide transition channel 202 and the grounding pattern 204 enclose the dielectric-filled cavity within the vertical waveguide transition channel 202. The via holes 206 are generally closely spaced to form an equivalent wall to the electromagnetic waves excited by the input port 116. In effect, the electromagnetic waves effectively see the collection of via holes 206 as a metal plate wall that is generally not feasible or is cost-prohibitive to create during PCB fabrication. The diameter and spacing of the via holes 206 are designed to minimize or prevent energy leaking through the via fence, which would deteriorate the performance of the vertical microstrip-to-waveguide transition.

The vertical waveguide transition channel 202 includes a vertical taper 208 and an output aperture 210. The vertical waveguide transition channel 202 can be metal, a metal-plated material, or plastic. The vertical taper 208 begins near the longitudinal edge of the vertical waveguide transition channel 202 nearest the input port 116 and gradually progresses toward the top surface. The taper allows the vertical waveguide transition channel 202 to transform from a microstrip mode at the input port 116 (quasi-transverse electromagnetic mode (TEM)) to waveguide mode at the waveguide 114. The vertical taper 208 is designed to match an impedance of the waveguide 114. The output aperture 210 of the vertical waveguide transition channel 202 has an approximately rectangular shape and electromagnetic waves exit it in the waveguide mode. The output aperture 210 can feed the waveguide 114. In other implementations, the output aperture 210 can feed a test port.

In the depicted examples, the dimensions of the vertical waveguide transition channel 202 can be 6.3 millimeters (mm) in the longitudinal direction 220, 3.7 mm in the lateral direction 222, and 1 mm in a vertical direction with a thickness of 0.3 mm. The dimensions of the output aperture 210 can be sized to approximately match the dimensions of an input aperture of the waveguide 114. In the depicted example, the output aperture 210 is slightly smaller than the input aperture of the waveguide 114 (e.g., a WR10 waveguide) with dimensions of 2.13 mm in the lateral direction 222 and 0.74 mm in the longitudinal direction 220.

Other dimensions for the vertical waveguide transition channel 202 and the output aperture 210 are also possible. The dimensions can be designed and selected to accommodate specific board layout requirements, MMIC-port topologies, and waveguide sizes, while maintaining impedance matching and low energy loss.

The vertical waveguide transition channel 202 is placed on the grounding pattern 204. The vertical waveguide transition channel 202 can be filled with various dielectrics, including air. As a result, the vertical waveguide transition channel 202 can function as an air waveguide. For example, the vertical waveguide transition channel 202 can be mounted directly on the grounding pattern 204. The vertical waveguide transition channel 202 is mounted to the first surface using a surface-mount technology process, which can use a solder paste 212 or conductive epoxy.

In operation, energy from an MMIC (not illustrated in FIG. 2) or another processor is delivered to the input port 116. The input port 116 can have a supplier-defined or other arbitrary impedance (e.g., 100 ohms). The input port 116 transmits the energy into the vertical waveguide transition channel 202.

At the output aperture 210 of the vertical waveguide transition channel 202, the waveguide mode purity is high, which allows for a small air gap in the interface between the vertical waveguide transition channel 202 and the waveguide 114. Based on simulations of different air gaps at this interface, the vertical microstrip-to-waveguide transition can withstand up to 0.075-millimeter air gaps without a significant increase in the insertion loss or the return loss with a bandwidth of approximately 11 GHz. As a result, the described vertical microstrip-to-waveguide transition can tolerate up to 0.075-millimeter air gaps that are larger than a typical thickness of non-conductive pressure-sensitive adhesive, which is manufacturing efficient. In this way, the described vertical waveguide transition channel 202 simplifies the attachment procedure for the waveguide 114 and allows for inexpensive and efficient manufacturing processes to complete the vertical microstrip-to-waveguide transition.

FIGS. 3-1 and 3-2 illustrate perspective views 300-1 and 300-2, respectively, of another example upward microstrip-to-waveguide transition. A vertical waveguide transition channel 302 is another example of the vertical waveguide transition channel 112 of FIG. 1. The vertical microstrip-to-waveguide transition includes the PCB 110, the input port 116, the vertical waveguide transition channel 302, the grounding pattern 204, and a waveguide 304. The waveguide 304 includes the output aperture 118 that is in line with the longitudinal direction 220. In particular, the dimensions of the vertical waveguide transition channel 302 can be designed based on the dimensions of the waveguide 304.

Example Method

FIG. 4 illustrates an example method 400 for manufacturing a vertical microstrip-to-waveguide transition following techniques, apparatuses, and systems of this disclosure. Method 400 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 3-2, reference to which is made for example only. The techniques are not limited to performance by one entity or multiple entities.

At 402, a transition channel is formed that includes a vertical taper between a bottom surface and a top surface. For example, the vertical waveguide transition channel 202 can be stamped, etched, cut, machined, cast, molded, or formed in some other way. As one example, the vertical waveguide transition channel 202 may be formed using a sheet-metal drawing process, which includes using tensile forces to stretch the metal material to a desired shape and thickness. The vertical waveguide transition channel 202 may also be formed using a sheet-metal-stamping process, which includes applying pressure to the metal material by using a stamping press to form the desired shape and thickness. For complex shapes, the sheet-metal-stamping process may cost less than the sheet-metal-drawing process. The vertical waveguide transition channel 202 may additionally be formed using a cast heatsink. The vertical waveguide transition channel 202 can be metal or plastic.

The vertical waveguide transition channel 202 includes a bottom surface, a top surface, and the output aperture 210 in the top surface. The vertical waveguide transition channel 202 includes a vertical taper between the bottom surface and the top surface. The output aperture 210 has an approximately rectangular shape and can be sized to approximate the input aperture of the waveguide 114. The waveguide 114 can be mounted on the vertical waveguide transition channel 202 with an inlet aperture of the waveguide 114 being positioned over the output aperture 210. The output aperture 118 of the waveguide 114 can be in line with the lateral direction 222 (e.g., a lateral axis) or the longitudinal direction 220 (e.g., a longitudinal axis) of the vertical waveguide transition channel 202. The waveguide 114 can be operatively connected to an antenna input on another PCB.

The vertical waveguide transition channel 202 can withstand up to a 0.075-millimeter air gap at the interface between the waveguide 114 and the top surface of the vertical waveguide transition channel 202. In particular, the vertical taper 208 of the vertical waveguide transition channel 202 can be configured to match an impedance of the vertical waveguide transition channel 202 at the output aperture 210 with an impedance of the waveguide 114.

In one example, the thickness of the vertical waveguide transition channel 202 can be approximately 0.3 millimeters. The vertical waveguide transition channel 202 can have a length of approximately 6.3 millimeters in the longitudinal direction 220, a width of approximately 3.7 millimeters in the lateral direction 222, and a height of approximately one millimeter in a vertical direction perpendicular to the PCB 110. The output aperture 210 can have a width of approximately 2.13 millimeters in the lateral direction 222 and a length of approximately 0.74 millimeters in the longitudinal direction 220.

At 404, the transition channel is mounted on a grounding pattern that is located on a first surface of a PCB to form a dielectric-filled portion. For example, the vertical waveguide transition channel 202 is mounted directly on the grounding pattern 204 which is located a first surface of the PCB 110, which can be a multi-layer PCB or a hybrid PCB stack-up. The vertical waveguide transition channel 202 is mounted to the first surface using a surface-mount technology process, which can use a reflow process or conductive epoxy. The interior surface of the vertical waveguide transition channel 202, along with the grounding pattern, form a dielectric-filled portion over the PCB 110. The dielectric-filled portion can be filled with air.

The grounding pattern 204 is made of a conductive material (e.g., a copper alloy). The grounding pattern 204 has an approximately rectangular shape with two extensions extending in the longitudinal direction 220. The grounding pattern 204 also includes via holes to a second surface (e.g., a bottom surface), which is opposite the first surface of the PCB 110. The PCB 110 also includes a microstrip as part of the input port 116 on the first surface (e.g., the top surface of the PCB 110). The microstrip is operatively connected to a processor (e.g., a MMIC) also located on the first surface of the PCB 110 and is configured to provide impedance matching to feed lines from the processor.

At 406, electromagnetic signals are received or transmitted via the transition channel at or by an antenna operatively connected to the transition channel. For example, the antenna receives or transmits electromagnetic signals that are routed via the vertical waveguide transition channel 202 through the radar system 102 to or from the MMIC.

EXAMPLES

In the following section, examples are provided.

Example 1

An apparatus comprising: a printed circuit board (PCB) comprising: a first surface; a microstrip located on the first surface and operatively connected to a processor located on the first surface; and a grounding pattern located on the first surface, the grounding pattern being made of a conductive material; and a transition channel mounted on and positioned over the grounding pattern, the transition channel comprising a bottom surface, a top surface, and an aperture in the top surface, the bottom surface opposite the grounding pattern, the transition channel including a vertical taper between the bottom surface and the top surface, the transition channel defining a dielectric-filled portion formed by the grounding pattern and an interior surface of the transition channel.

Example 2

The apparatus of Example 1, wherein the transition channel is mounted to the PCB using a surface-mount technology process.

Example 3

The apparatus of Example 2, wherein the surface-mount technology process uses a reflow process or a conductive epoxy.

Example 4

The apparatus of any one of the preceding Examples, wherein the aperture has an approximately rectangular shape.

Example 5

The apparatus of any one of the preceding Examples, wherein a waveguide is mounted on the transition channel, an inlet aperture of the waveguide being positioned over the aperture in the top surface of the transition channel.

Example 6

The apparatus of Example 5, wherein the vertical taper is configured to match an impedance of the transition channel at the aperture with an impedance of the waveguide.

Example 7

The apparatus of Example 6, wherein the transition channel is configured to withstand a 0.075-millimeter air gap at an interface between the waveguide and the transition channel.

Example 8

The apparatus of Example 5 or 6, wherein an output aperture of the waveguide is in line with a longitudinal direction of the transition channel.

Example 9

The apparatus of any one of the preceding Examples 5 or 6, wherein an output aperture of the waveguide is in line with a lateral direction of the transition channel.

Example 10

The apparatus of any of Examples 5 through 9, wherein the waveguide is operatively connected to an antenna input on another PCB.

Example 11

The apparatus of any one of the preceding Examples, wherein the grounding pattern has an approximately rectangular shape and includes via holes to a second surface of the PCB, the second surface being opposite the first surface of the PCB.

Example 12

The apparatus of any one of the preceding Examples, wherein the microstrip is configured to provide impedance matching to feed lines from the processor.

Example 13

The apparatus of any one of the preceding Examples, wherein the conductive material comprises a copper alloy.

Example 14

The apparatus of any one of the preceding Examples, wherein the dielectric-filled portion is filled with air.

Example 15

The apparatus of any one of the preceding Examples, wherein the transition channel comprises metal or plastic.

Example 16

The apparatus of Example 15, wherein a thickness of the metal or plastic of the transition channel is approximately 0.3 millimeters.

Example 17

The apparatus of Example 16, wherein: a length of the transition channel in a longitudinal direction is approximately 6.3 millimeters, a height of the transition channel in a vertical direction perpendicular to the PCB is approximately one millimeter; and a width of the transition channel in a lateral direction is approximately 3.7 millimeters, the lateral direction being perpendicular to the longitudinal direction.

Example 18

The apparatus of Example 17, wherein: a width of the aperture in the top surface of the transition channel in the lateral direction is approximately 2.13 millimeters; and a length of the aperture in the longitudinal direction is approximately 0.74 millimeters.

Example 19

The apparatus of any one of the preceding Examples, wherein the apparatus comprises a radar system.

Example 20

The apparatus of Example 19, wherein the radar system is configured to be part of a vehicle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. An apparatus comprising:
a printed circuit board (PCB) comprising:
a first surface;
a processor mounted on the first surface;
a microstrip located on the first surface and operatively connectable the processor located on the first surface;
a grounding pattern located on the first surface, the grounding pattern being made of a conductive material; and
a transition channel mounted on, positioned over, and substantially covering the grounding pattern, the transition channel comprising a bottom surface, a top surface, and an aperture in the top surface, the bottom surface opposite the grounding pattern, the transition channel including a vertical taper having a continuous slope extending between the bottom surface and the top surface, the transition channel defining a dielectric-filled portion formed by the grounding pattern and an interior surface of the transition channel.

2. The apparatus of claim 1, wherein the transition channel is mounted to the PCB using a surface-mount technology process.

3. The apparatus of claim 2, wherein the surface-mount technology process uses a reflow process or a conductive epoxy.

4. The apparatus of claim 1, wherein the aperture has an approximately rectangular shape.

5. The apparatus of claim 1, wherein a waveguide is mounted on the transition channel, an inlet aperture of the waveguide being positioned over the aperture in the top surface of the transition channel.

6. The apparatus of claim 5, wherein the vertical taper is configured to match an impedance of the transition channel at the aperture with an impedance of the waveguide.

7. The apparatus of claim 6, wherein the vertical taper of the wave guide transition channel is configured to match an impedance of the waveguide transition channel at the output aperture with an impedance of the waveguide.

8. The apparatus of claim 5, wherein an output aperture of the waveguide is in line with a longitudinal direction of the transition channel.

9. The apparatus of claim 5, wherein an output aperture of the waveguide is in line with a lateral direction of the transition channel.

10. The apparatus of claim 5, wherein the waveguide is operatively connectable to an antenna input on another PCB.

11. The apparatus of claim 1, wherein the grounding pattern has an approximately rectangular shape and includes via holes to a second surface of the PCB, the second surface being opposite the first surface of the PCB.

12. The apparatus of claim 1, wherein the microstrip is configured to provide impedance matching to feed lines from the processor.

13. The apparatus of claim 1, wherein the conductive material comprises a copper alloy.

14. The apparatus of claim 1, wherein the dielectric-filled portion is filled with air.

15. The apparatus of claim 1, wherein the transition channel comprises metal or plastic.

16. The apparatus of claim 15, wherein a thickness of the metal or plastic of the transition channel is approximately 0.3 millimeters.

17. The apparatus of claim 16, wherein:
a length of the transition channel in a longitudinal direction is approximately 6.3 millimeters,
a height of the transition channel in a vertical direction perpendicular to the PCB is approximately one millimeter; and
a width of the transition channel in a lateral direction is approximately 3.7 millimeters, the lateral direction being perpendicular to the longitudinal direction.

18. The apparatus of claim 17, wherein:
a width of the aperture in the top surface of the transition channel in the lateral direction is approximately 2.13 millimeters; and
a length of the aperture in the longitudinal direction is approximately 0.74 millimeters.

19. The apparatus of claim 1, wherein the apparatus comprises a radar system.

20. The apparatus of claim 19, wherein the radar system is configured to be part of a vehicle.

* * * * *

UNITED STATES PATENT AND TRADEMARK OFFICE
CERTIFICATE OF CORRECTION

PATENT NO. : 12,265,172 B2
APPLICATION NO. : 17/804061
DATED : April 1, 2025
INVENTOR(S) : Syed An Nazmus Saqueb et al.

Page 1 of 1

It is certified that error appears in the above-identified patent and that said Letters Patent is hereby corrected as shown below:

On the Title Page

Column 2, item (57) Abstract, Line 4: Delete "(MIMIC)" and insert --(MMIC)--
Column 2, item (57) Abstract, Line 7: Delete "MIMIC." and insert --MMIC.--

In the Claims

Column 12, Line 42: In Claim 7, after "the", delete "output"

Signed and Sealed this
Twentieth Day of May, 2025

Coke Morgan Stewart
*Acting Director of the United States Patent and Trademark Office*